May 28, 1946. K. H. HACHMUTH ET AL 2,401,242
PROCESS FOR HYDROCARBON CONVERSION
Filed Oct. 3, 1942
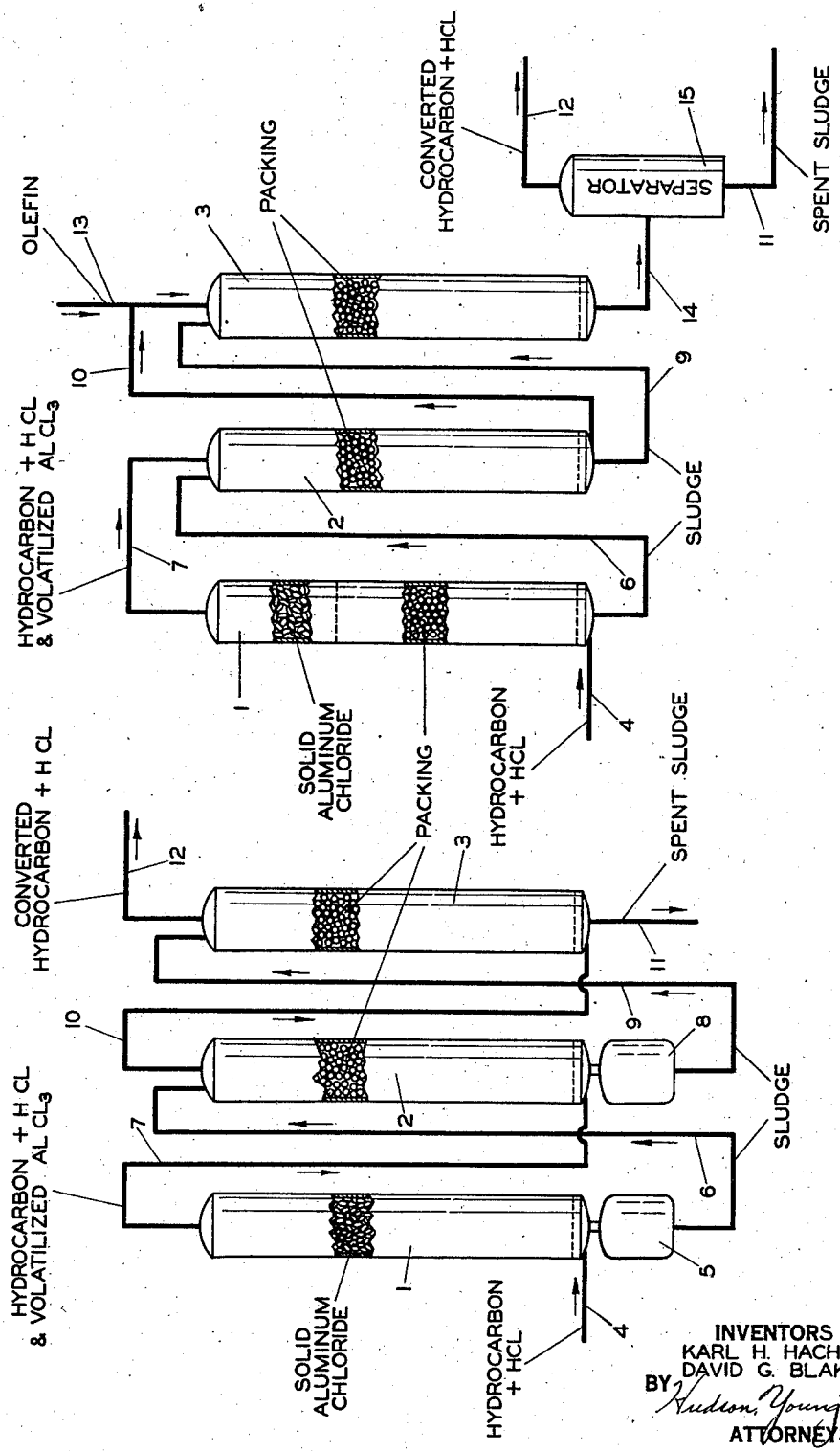

Patented May 28, 1946

2,401,242

UNITED STATES PATENT OFFICE 2,401,242

PROCESS FOR HYDROCARBON CONVERSION

Karl H. Hachmuth, Bartlesville, Okla., and David G. Blaker, Mission, Kans., assignors to Phillips Petroleum Company, a corporation of Delaware Application October 3, 1942, Serial No. 460,702

12 Claims. (Cl. 260—683.5)

This invention relates to hydrocarbon conversion processes utilizing sludge-forming metal halide catalysts of the Friedel-Crafts type. More particularly it relates to the utilization of metal halide-hydrocarbon sludges formed in hydrocarbon conversions such as isomerization and alkylation reactions catalyzed by aluminum chloride, aluminum bromide, and the like.

Of great commercial interest at the present time are the isomerization and alkylation of low-boiling hydrocarbons, particularly members of the paraffin series such as the butanes and pentanes. In these reactions, a simple chemical change is effected under relatively mild conditions. In the case of isomerization, a change in carbon skeleton without change in number of carbon atoms occurs, and in the case of alkylation, the direct union of two molecules, such as an isoparaffin and an olefin, occurs to produce a higher molecular weight saturated hydrocarbon. These reactions are known to be catalyzed in a greater or lesser extent by the so-called Friedel-Crafts catalysts, among the better known of which may be mentioned aluminum chloride, aluminum bromide, boron fluoride, zinc chloride, ferric chloride, antimony trifluoride, and other polyvalent metal halides. Aluminum chloride has as to date received the greatest commercial acceptance due to its activity, relatively low cost, and availability. Accordingly, because of its importance, and for the sake of convenience we shall describe our invention with particular reference to the isomerization of normal butane to isobutane as catalyzed by aluminum chloride. Application of the invention to other similar hydrocarbon conversions, using aluminum chloride or other Friedel-Crafts type metal halide catalysts which form sludges under the conditions of operation, will be apparent to those skilled in the art in view of the detailed disclosure to follow.

In an isomerization process utilizing anhydrous aluminum chloride as a catalyst, the catalyst may be charged to the process either as a solid or as a slurry with considerable aluminum chloride dissolved and/or suspended in hydrocarbons or other suitable liquid. In either case, a liquid sludge is produced after a short period of operation. We have found that ordinarily the sludge at the outset is active as a catalyst and gradually becomes deactivated with use. The utilization of such sludge to avoid wasting any catalytic activity it may have, would be of appreciable economic advantage.

In general, reference in this application to sludges refers primarily to sludges formed by contact of the hydrocarbon reactants with aluminum chloride, rather than to suspension or slurries of aluminum chloride prepared for direct use as a primary catalyst, although the sludges may have appreciable quantities of aluminum chloride dissolved and/or suspended therein. Such sludges are relatively free from asphaltic or tarry materials and are utilized according to our invention at mild conditions of temperature similar to those used in the reaction zone proper.

Aluminum chloride and other Friedel-Crafts catalysts are relatively volatile, and may also exhibit appreciable solubility in liquid hydrocarbons. This volatility and solubility give rise to serious operating difficulties, particularly in continuous processes. The isomerization of butane may be carried out with the hydrocarbon in the liquid or gaseous phase, the latter being more often used. Small but appreciable quantities of aluminum chloride are carried out of the catalyst chamber along with the isomerization products. This aluminum chloride is deposited in the transfer lines, valves, and other parts of the equipment, particularly at points of lower temperature than that obtaining in the catalyst chamber. These deposits of aluminum chloride require frequent shut down to enable their removal, with consequent loss of plant capacity and the expenditure of otherwise unnecessary labor. The corrosive effects of the aluminum chloride are also frequently serious, particularly in the valves and pumps. It is also difficult to obtain products of the process free from aluminum chloride, which may interfere with subsequent use of such products.

Aluminum chloride sludge has been found to be highly corrosive to most ordinary metals and other material of construction when in motion. The use of such sludge as by circulating it at relatively high rates of flow, bubbling gaseous reactants through it, or subjecting the sludge in other ways to violent agitation would cause severe erosion and/or corrosion problems from motion of the sludge.

It is an object of this invention to provide for improved non-destructive hydrocarbon reactions wherein a Friedel-Crafts type metal halide is used as catalyst under relatively mild conditions. Another object is to provide for the utilization of metal halide sludge formed during such reactions. A further object is to provide for carrying out such hydrocarbon conversions as isomerization, alkylation, and the like, with aluminum halide and similar relatively volatile catalysts. Yet another object is to utilize the catalytic activity of aluminum chloride-hydrocarbon sludges. A still further object is to remove from the hydrocarbon effluents from the catalyst zone the volatilized and/or dissolved metal halide catalyst contained therein, and thus avoid fouling of equipment through which such effluents subsequently pass. Yet another object is to provide suitable apparatus for such processes. Many other objects as well as advantages of this invention will be apparent from the present disclosure.

We have found that the aforementioned aluminum chloride or similar metal halide sludge may be used in an effective manner to utilize any catalytic activity it may have, and to remove the aluminum chloride carried over in the catalyst chamber effluents, thus effectively diminishing or stopping entirely the carry-over into other parts of the plant equipment. We may thus use for a useful purpose the sludge which might otherwise be wasted. A preferred aspect of our invention involves the use of sludge in such a manner as to avoid severe erosion and/or corrosion problems from motion of the sludge.

In one aspect our invention comprises first subjecting low-boiling hydrocarbons to be treated to conversion in the presence of aluminum chloride or other similar catalyst. During the conversion a sludge is formed which may or may not exhibit catalytic activity, depending upon reaction conditions, etc. The total effluents from the conversion step are then brought into contact with the sludge, various manners of accomplishing this being described in detail below. This contacting of effluents and sludge, in the case wherein the sludge retains some catalytic activity, will cause further conversion to occur and at the same time spend the sludge to partial or complete exhaustion of activity. Simultaneously, the small but important amount of aluminum chloride hereinabove referred to which is carried away from the catalyst by the effluent reactants, is removed readily by the sludge by absorption or solution. In the case wherein the sludge does not have much or any catalytic activity, it acts to remove the residual aluminum chloride from the reactants, being even more efficient in this respect than sludge having appreciable catalytic activity. It is in fact preferable that the last portions of sludge contacted by the effluents should have no substantial activity as a catalyst; this ensures the most complete removal of residual aluminum chloride, as will be explained below.

We have found that the aluminum chloride sludge will very readily dissolve or otherwise take up large quantities of aluminum chloride. In fact, there appears to be no limit to the quantity of aluminum chloride that can be dissolved in such a sludge except for the practical limitation that at any particular temperature the sludge will become more and more viscous as more aluminum chloride is dissolved therein until finally a point is reached where the viscosity of the sludge is so high that it becomes impractical to handle it at that temperature. At higher temperatures the same sludge will become quite fluid again and capable of dissolving more aluminum chloride. However, we have found that such a sludge which has taken up a considerable amount of aluminum chloride will no longer give as complete a removal of volatilized aluminum chloride from the reaction products as can be obtained by totally spent sludge. This is the reason for finally contacting the reaction products with substantially spent sludge.

The extent to which an active sludge will become deactivated by contact with reactants is dependent upon contact time, temperature, nature of reactants, etc. It will be seen from the discussion herein that when an active sludge is contacted with effluents from the aluminum chloride catalyst zone, there are opposing factors tending to change the activity of the sludge. Continuance of the catalyzed reaction tends to spend the sludge, while absorption or solution of carried-over aluminum chloride tends to activate the sludge. These factors must be considered in any particular situation to obtain the optimum conditions for utilizing to the fullest extent possible, consistent with economic operation, any catalytic activity available while ensuring final substantially complete removal of aluminum chloride from the effluents of the process. This may readily be done by one skilled in the art by following the teachings of the present disclosure, suitably modified for the particular process in question.

One manner of obtaining completely spent sludge for the final contacting step, particularly useful in such reactions as the isomerization of saturated hydrocarbons wherein the sludge becomes completely spent only very slowly, is to contact the sludge with olefins or other unsaturated hydrocarbon material, preferably in the presence of the reaction products. Such olefins or the like serve to "kill" the sludge rapidly, thus permitting complete removal of residual aluminum chloride from the reaction products. This method of ensuring complete removal of active metal halides such as aluminum chloride from hydrocarbons is described and claimed broadly in the co-pending application of Karl H. Hachmuth, Serial No. 460,703, filed October 3, 1942. In the isomerization of normal butane to isobutane, for example, we may use butylene or other low-boiling olefins for this purpose, injecting them into the stream of reaction zone effluents before or during final contacting of such effluents with sludge. Only a very small proportion of butylenes need be used, and the butylenes are not entirely wasted, inasmuch as they act as alkylating agents and react at least partially with isobutane to give iso-octane, which may subsequently be recovered.

Temperature and pressure conditions used in our process are mild so that no extensive decomposition occurs, being ordinarily the conventional conditions for the various types of conversions to which the invention may be applied. In most cases temperatures in the sludge contacting zone or zones will be no higher than those maintained in the principal reaction zone. It will frequently be desirable to operate below the reaction zone temperature in order to effect ready condensation as well as solution of the aluminum chloride vapors in the effluent products from the reaction zone.

Sludge expelled from a system involving this invention may be sent to sludge disposal, to a process for recovery of aluminum chloride, or if the sludge has become sufficiently activated with dissolved aluminum chloride, it may be returned to the reaction zone as a catalyst and/or used in another contacting stage to utilize its activity.

In general, sludge formed in a first reaction chamber containing solid aluminum chloride, which sludge may or may not have catalytic activity, is passed to a second chamber or a series of chambers packed with ceramic rings or other suitable packing, in such manner that the sludge distributes itself over the packing to give a highly extended surface. By this arrangement the motion of the sludge at the walls of the containing vessels is reduced to a minimum, the flow rate of sludge through the apparatus is slow, and consequently the erosion and/or corrosion is reduced sufficiently to permit the use of ordinary materials of construction. Accordingly, the use of packed chambers is a preferred feature of our invention. The hydrocarbon conversion reaction products are passed from the reaction chamber through the sludge-contacting chamber or series of chambers either parallel or countercurrent to the sludge flow. The exact number of chambers, the rates of flow of sludge and hydrocarbons, and the relative directions of flow will be chosen with respect to the activity of the sludge, and the amount of aluminum chloride carried out of the first catalyst chamber by the effluents therefrom. These factors in turn are dependent on the type of reaction being catalyzed.

The accompanying drawing and description thereof are provided for the purpose of better illustrating and exemplifying the invention, and show two different ways of carrying out a butane isomerization process. Numerous other modifications may be used, for carrying out various reactions, by following the teachings of this disclosure, and no particular limitations are therefore implied.

Figure 1 shows in diagrammatic form one arrangement of apparatus wherein the sludge and hydrocarbon effluents are passed countercurrently in two chambers arranged in series. Figure 2 shows another arrangement wherein sludge and reaction zone effluents are contracted concurrently, first in one chamber and then in another, with olefins being added between the two chambers to "kill" the sludge. Another feature of the arrangement shown in Figure 2 is the contacting of hydrocarbon feed to the catalyst chamber with sludge before its contact with solid aluminum chloride. In both figures portions of the outer walls of the chambers are cut away to expose the contents thereof to view.

Referring now to Figure 1, dry gaseous normal butane, either pure or containing minor amounts of isobutane and/or lighter gases such as propane, along with activating amounts of anhydrous hydrogen chloride or other activating agent, is introduced into the bottom of catalyst chamber 1 through conduit 4. The hydrogen chloride may be introduced into the reaction zone in other ways if desired, and in most cases will comprise from 3 to 15 mol per cent of the feed. Chamber 1 is operated at a pressure of 100 to 150 pounds per square inch gage and a temperature of about 200° F. The feed being introduced through conduit 4 is heated to the approximate reaction temperature by means not shown. If necessary, the butane is dehydrated before introduction to the catalyst. The flow rate will generally be between about 0.1 to 2.0 liquid volumes of hydrocarbon feed per volume of catalyst chamber per hour. Catalyst chamber 1 contains pieces of solid anhydrous aluminum chloride of about 20 mesh or larger. Chamber 1 may also contain supported aluminum chloride catalyst.

After the process has been in operation a short time a liquid sludge is formed which usually contains appreciable amounts of aluminum chloride that is still active as an isomerization catalyst. This sludge runs down to the bottom of chamber 1 and is continuously withdrawn into receiver 5 from which it is transferred via conduit 6 into the top of chamber 2. The gaseous effluent from chamber 1, which comprises isobutane, normal butane, hydrogen chloride, lighter gases and small amounts of volatilized aluminum chloride, is passed from the top of chamber 1 into the bottom of chamber 2 by means of conduit 7.

Chamber 2, and also chamber 3, are filled with ceramic ware rings or other suitable type packing. The liquid sludge flows downwardly through the chamber and is distributed over the surfaces of the packing so that a highly extended surface of sludge is thus presented to the gases passing through the chamber. The conversion of normal butane to isobutane continues in chamber 2, due to the activity of the sludge, although generally at a considerably lower rate than the reaction in chamber 1. Furthermore, the residual aluminum chloride in the gases from conduit 7 is absorbed and/or dissolved in the sludge in chamber 2. The sludge reaching the bottom of chamber 2 will have more or less catalytic activity remaining, dependent upon the relationship of the amount of aluminum chloride taken up from the gases and the amount of deactivation occurring due to continued hydrocarbon conversion, etc. The contact time may be so lengthened in chamber 2 that the gaseous effluents therefrom are substantially free from aluminum chloride in which case an additional contacting chamber will not be needed. Frequently, however, it is more desirable to provide chamber 3, which is similar to chamber 2 in construction and function.

In such case, the sludge from chamber 2, which accumulates in receiver 8, is passed via conduit 9 into the top of chamber 3, wherein it again becomes distributed over the packing to provide a large surface area. The effluent hydrocarbons, hydrogen chloride, and traces of aluminum chloride, from chamber 2, pass into the bottom of chamber 3 by way of line 10. The gases so introduced into chamber 3 pass upwardly therethrough countercurrently to the sludge, and pass out to further treatment, separation or the like via conduit 12. Spent sludge is taken from the bottom of chamber 3 by line 11.

The effluents from chamber 3 comprise unconverted normal butane, isobutane produced in the process, traces of five-carbon-atom and heavier hydrocarbons, hydrogen chloride, and minor amounts of other gases lighter than isobutane which may have been introduced into the feed and/or produced by side reactions.

Hydrogen and propane are frequently used in the process to minimize undesired side reactions and maintain catalyst life. The amount of propane used may be as high as ten per cent or more, while smaller volumes of hydrogen are usually used, if at all. It will be understood that the effluents from the process as just described may be subjected to any of the separating or other steps known to the art. These usually include separation of hydrogen chloride, propane, and unconverted normal butane, which are recycled to catalyst chamber 1. Various other expedients which are known to the art may of course be utilized as particular circumstances indicate.

Due to contact with the sludge in chambers 2 and 3, the products in line 12 contain a higher proportion of isobutane than those in line 7, and are substantially free from residual aluminum chloride, which makes possible their further treatment without encountering the troublesome condensation of aluminum chloride in lines and equipment as referred to above.

Figure 2 shows a modification of the butane isomerization just described with reference to Figure 1. In Figure 2, reaction chamber 1 is divided into two sections, the upper section containing the solid aluminum chloride catalyst, and the lower section being packed with stone rings or the like. The reaction feed containing normal butane and hydrogen chloride enters the bottom of chamber 1 through line 4, and leaves the top through line 7. Sludge formed during the reaction flows downward over the packing in the lower part of the chamber and thus comes in contact with the incoming feed before said feed is contacted with the solid catalyst. Such an arrangement of catalyst and packing, and the process of contacting the feed first with sludge and then with the solid catalyst, are disclosed and claimed in the co-pending application of Frederick C. Neuhart, Serial No. 460,854, filed October 5, 1942, and thus do not form a part of the present invention except in combination as described with various aspects of our invention.

The sludge in contacting the incoming normal butane in the lower part of reaction chamber 1 effects a preliminary conversion of the butane and loses a considerable part of its catalytic activity in so doing. This sludge is then passed from the bottom of chamber 1 to the top of chamber 2 by means of line 6, and distributes itself over the packing contained in that chamber. The effluents in line 7 also enter the top of chamber 2, and pass downward therethrough concurrently with the sludge. If desired, the flow of sludge and reactants may be countercurrent instead of concurrent in chamber 2. Reaction continues in this second chamber to a greater or less extent depending upon the activity of the sludge entering, the aluminum chloride in the vapors entering, and the contact time and conditions, as described above. Frequently the sludge entering chamber 2 in the arrangement shown in Figure 2 will have very little activity, and due to the aluminum chloride picked up, will leave the bottom of chamber 2 through line 9 more active than when it entered. In any case, when it is difficult or impossible to effect the complete absorption of aluminum chloride from the vapors, the sludge and vapors are passed on into chamber 3, which may be similar to chamber 2, via lines 9 and 10 respectively.

In order to ensure a hydrocarbon effluent from the process free from aluminum chloride, a relatively small volume of butylenes is injected into line 10 from line 13, or otherwise introduced into chamber 3. In the presence of the aluminum chloride at least part of the butylene reacts with isobutane to give branched-chain 8-carbon-atom paraffins. The principal function of the butylenes, however, is to deactivate the aluminum chloride and/or sludge entirely so that the last traces of aluminum chloride vapors will be removed from the gaseous reaction mixture, and the quantity of butylenes so introduced is made sufficient to accomplish this purpose. As stated, this quantity is small, much less than one per cent, based on the hydrocarbons in the reaction mixture, frequently being sufficient, while a few per cent is the maximum that would ordinarily be required. Of course it is understood that other olefins than butylene, for instance propylene, or other unsaturated hydrocarbons, may be used if desired.

The total effluent is passed from the bottom of chamber 3 via line 14 to separator 15 from which spent sludge is removed through line 11, while the converted hydrocarbons, hydrogen chloride, etc. now free from aluminum chloride, pass out through line 12 to further conventional treatment. Heavier hydrocarbons formed by reaction of the butylene may be separated out in unit 15 or otherwise, and recovered for use as desired.

Frequently a fluid catalyst is used instead of solid aluminum chloride in the primary reaction zone. This catalyst is usually a sludge or slurry prepared by suspending a relatively large amount of aluminum chloride in liquid hydrocarbons of one kind or another, and may comprise a hydrocarbon-aluminum chloride complex with or without additional free aluminum chloride. For example, a slurry containing aluminum chloride suspended in liquid hydrocarbons may be used for alkylation, particularly the alkylation of isoparaffins with olefins. In such a process, a side stream of sludge, or a stream of spent sludge, is used for the supplementary contacting of reaction chamber effluents in practicing this invention. This and many other applications, using aluminum chloride or other Friedel-Crafts type catalysts are encompassed within the scope of our invention.

We claim:

1. A process for isomerizing saturated hydrocarbons which comprises contacting said hydrocarbons with a sludge-forming metal halide isomerization catalyst of the Friedel-Crafts type to effect isomerization of said hydrocarbons, and contacting total hydrocarbon effluents from said contacting step with a catalyst consisting essentially of active metal halide sludge formed in said step and substantially different in composition from said catalyst used in said step to utilize catalytic activity of said sludge and obtain further isomerization.

2. The process of claim 1 in which said sludge is distributed over an inert packing material thus presenting an extended surface of sludge to said hydrocarbons.

3. The process of claim 1 in which said saturated hydrocarbons comprise essentially low-boiling normal paraffins and said metal halide is aluminum chloride.

4. A process for the isomerization of normal butane which comprises passing an anhydrous gaseous mixture comprising a major proportion of normal butane admixed with minor proportions of hydrogen chloride into a first chamber containing a solid anhydrous aluminum chloride catalyst at conditions of temperature, pressure and contact time to give a substantial yield of isobutane, passing a liquid comprising aluminum chloride sludge formed in said first chamber as an essential component thereof and substantially different in composition from said catalyst in said first chamber to a contacting zone comprising at least one other chamber containing a packing material over which said sludge becomes distributed, passing gases from said first chamber into said contacting zone to contact with said sludge whereby conversion is continued and aluminum chloride vapors in said gases are absorbed by said sludge, removing sludge from said contacting zone, passing gases from said contacting zone to separating means, separating isobutane, and recycling hydrogen chloride and unconverted normal butane to said first chamber.

5. The process of claim 4 in which said contacting zone consists of two similar chambers, and in which said sludge and said gases pass countercurrently to each other.

6. The process of claim 4 in which a small proportion of olefins is added to said gases subsequent to their passage from said first chamber but prior to their passage from contact with said sludge, said proportion being sufficient to substantially deactivate said sludge and thus effect complete absorption of aluminum chloride from said gases.

7. A process for effecting hydrocarbon conversions which comprises contacting hydrocarbon reactants with a catalytically active metal halide sludge produced as hereinafter described, whereby some reaction occurs and the sludge becomes at least partially deactivated, then contacting said reactants with an active Friedel-Crafts type metal halide catalyst whereby further reaction occurs, said metal halide sludge is produced, and small amounts of uncombined metal halide are incorporated in said reactants, and then contacting said reactants with said at least partially deactivated sludge whereby any catalytic activity of said sludge is at least partially utilized and said hydrocarbon reactants are at least partially freed of said metal halide incorporated therein.

8. The process of claim 7 in which said hydrocarbon conversion is an isomerization reaction, said hydrocarbon reactants are predominantly normal butane, said metal halide is an aluminum halide, and unsaturated hydrocarbons in sufficient amount to effect complete removal of said small amounts of aluminum halide from said reactants are incorporated in said reactants subsequent to their contact with said aluminum halide catalyst.

9. A process which comprises contacting relatively low-boiling hydrocarbon material with a bed of solid anhydrous sludge-forming metal halide catalyst of the Friedel-Crafts type under hydrocarbon conversion conditions, withdrawing from said bed an active metal halide sludge produced therein concomitantly with said conversion, and contacting hydrocarbons from said contacting step with said sludge under conversion conditions to continue said conversion through utilization of catalytic activity of said sludge.

10. The process of claim 9 in which said metal halide is aluminum chloride.

11. The process of claim 9 in which said hydrocarbon conversion is an isomerization reaction.

12. The process of claim 9 in which said hydrocarbon conversion is an alkylation reaction.

KARL H. HACHMUTH.
DAVID G. BLAKER.

Disclaimer 2,401,242.—*Karl H. Hachmuth*, Bartlesville, Okla., and *David G. Blaker*, Mission, Kans. PROCESS FOR HYDROCARBON CONVERSION. Patent dated May 28, 1946. Disclaimer filed Feb. 11, 1949, by the assignee, *Phillips Petroleum Company*.

Hereby enters this disclaimer to so much of claims 9, 10, 11, and 12 of said patent as may be construed to include any intermediate separation of hydrocarbon product between said bed of solid catalyst and said sludge.

[*Official Gazette March 29, 1949.*]